Figure 1:
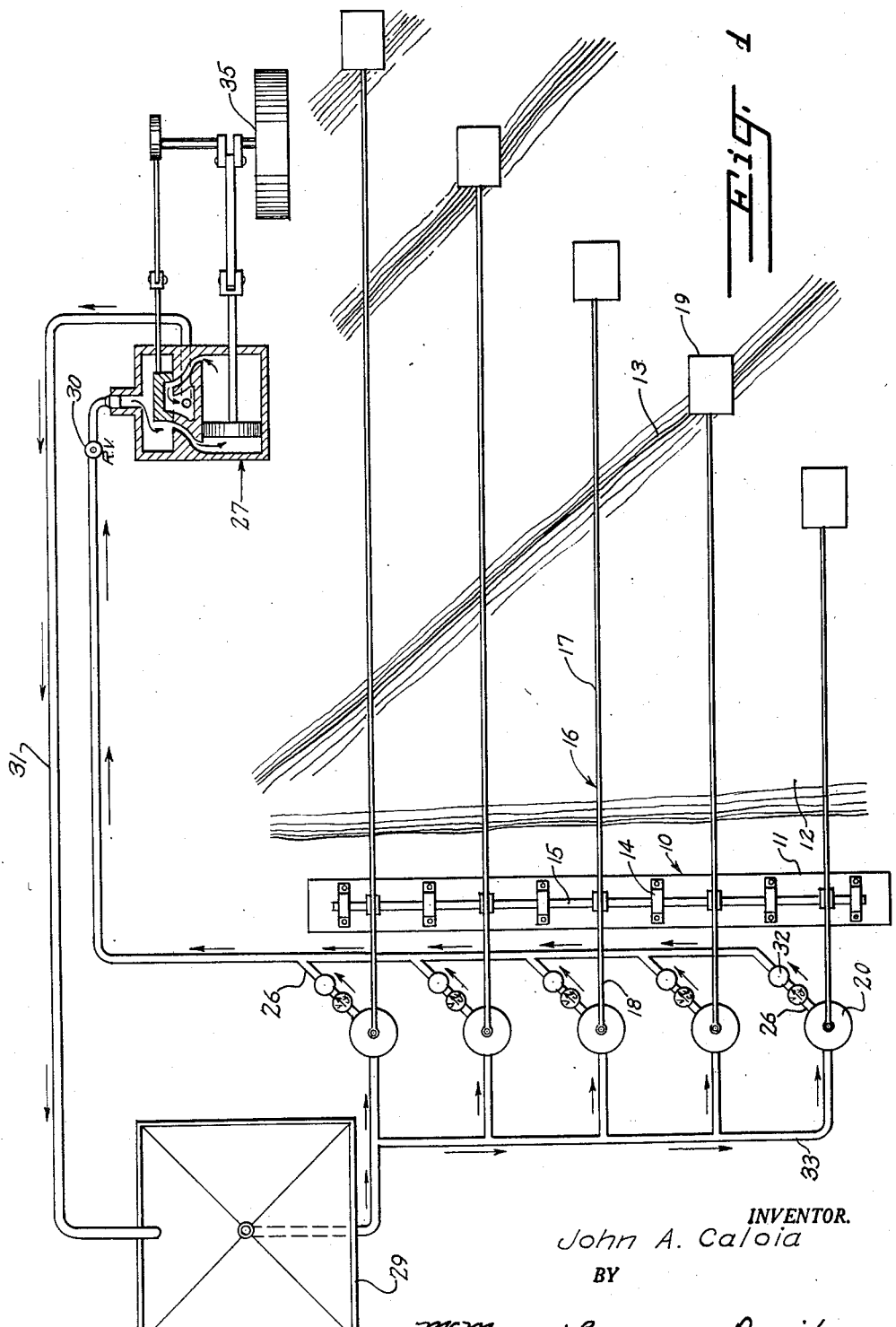

Aug. 19, 1958  J. A. CALOIA  2,848,189
APPARATUS FOR PRODUCING POWER FROM WATER WAVES
Filed April 22, 1955  2 Sheets-Sheet 1

INVENTOR.
John A. Caloia
BY
McMorrow, Berman & Davidson
Attorneys

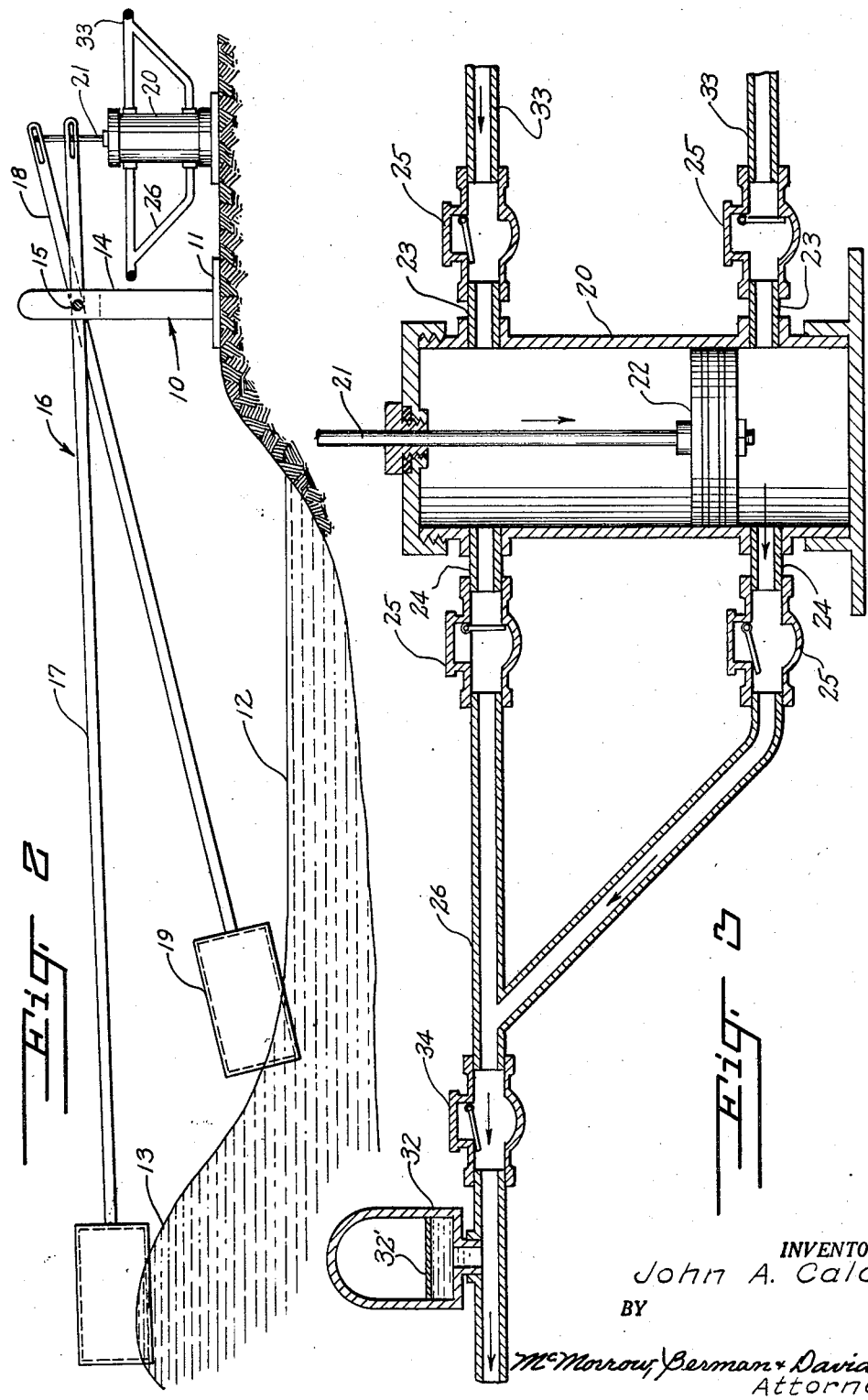

United States Patent Office 2,848,189
Patented Aug. 19, 1958

2,848,189

APPARATUS FOR PRODUCING POWER FROM WATER WAVES

John A. Caloia, Elsinore, Calif.

Application April 22, 1955, Serial No. 503,128

2 Claims. (Cl. 253—11)

The present invention relates to wave motors.

The primary object of the present invention is to provide an apparatus for producing power from the action of water waves.

Another object of the present invention is to provide an apparatus for producing power from waves of an ocean which may be installed along the shore, on a pier, or on other structure, and one which will work with small waves and ground swells as well as by the action of the tides.

A further object of the present invention is to provide an apparatus for producing power from water waves which is sturdy in construction, one having few moving parts, and one needing little or no attention, as well as one which may be used as a source of power for generating electricity, winding spring motors, or pumping water to places of storage.

These and other objects and advantages of the present invention will be fully apparent from the following description when taken in connection with the annexed drawings, in which:

Figure 1 is a plan view somewhat diagrammatic showing the apparatus of the present invention, Figure 2 is a side view of a portion of the present invention, and Figure 3 is a detailed view in cross-section of one of the pumps of the present invention.

Referring in greater detail to the drawings in which like numerals indicate like parts throughout the several views, the present invention consists in an apparatus for producing power from water waves comprising a support indicated generally by the reference numeral 10 having a base 11 adapted to be placed adjacent to a body of water having waves therein, the body of water being indicated in Figures 1 and 2 by the reference numeral 12 with waves indicated by the reference numeral 13. A plurality of upstanding supports or posts 14 connected to the base 11 support a horizontally disposed shaft 15 and a plurality of levers 16 are each fulcrumed on the shaft 15 intermediate the ends of each of the levers, with the portion between one end and the fulcrum providing a long arm 17 and the portion between the other end and the fulcrum providing a short arm 18.

The free end of each of the long arms 17 carries a float 19 constructed of a steel tank, a log or plurality of logs, or other buoyant body.

An upstanding pumping cylinder 20 is positioned adjacent the free end of each of the short arms of the levers 16 and has closed upper and lower ends with a piston rod 21 having one end projecting upwardly through the upper end of the cylinder 20, the upper end of the piston rod being connected to the free end of each of the short arms 18 of the levers 16. A piston 22 is connected to the other end of each of the piston rods 21. Each cylinder 20 has an inlet 23 and an outlet 24 at each end, with check valves 25 operable to admit fluid to each end of the cylinder in turn when wave motion causes a reciprocal movement of the piston 22 within its respective cylinder, the direction of flow of fluid being indicated by arrows in Figure 3 with an arrow within the cylinder indicating the direction of movement of the piston.

A conduit 26 connects each outlet 24 with the inlet side of a fluid motor 27, there being provided a normally closed relief valve 30 in the conduit leading to the inlet side of the fluid motor 27. A second conduit 31 connects the outlet side of the fluid motor 27 with a reservoir 29.

An accumulator 32 having a diaphragm 32' is provided for each of the cylinders and shown somewhat diagrammatically in reduced size in Figure 3, so that fluid pressure may be accumulated until needed by the fluid motor, and also to keep the fluid pressure even and steady, the air above the diaphragm 32' in each accumulator compressing during slack periods of operation of the fluid motor 27 and releasing the fluid when needed by the fluid motor.

Still another conduit 33 connects each of the inlets of each cylinder 20 to the reservoir 29 so that the fluid may be used over and over again.

A check valve 34 in the conduit 26 prevents back flow of the fluid from the fluid motor 27 to any one of the cylinders 20.

As will be seen in Figure 1, the floats 19 on the free ends of the levers 16 are positioned at varying lengths with respect to each other so that they intercept the waves at different points relative to the shore line, this provision being made so that a steady flow of the fluid to the fluid motor will keep the motor 27 operating at an even rate.

While only one form of the fluid motor 27 is here illustrated as an example, other fluid motors could be used as well, and spring motors, for instance, could be wound by the apparatus of the present invention, or any type of power accumulator could be successfully energized by the apparatus of the present invention.

The power of the waves, whether the waves were large or small, or ground swells, or tides, will be successfully transformed to usable power such as turning a flywheel 35, it being understood that an electrical generator could be connected to such a device. Water pumps could be connected to the flywheel 35 for pumping water from one level to another, such as is in common use in irrigation.

What is claimed is:

1. An apparatus for producing power from water waves comprising a support adapted to be positioned adjacent a body of water having waves therein, a horizontally disposed shaft carried by said support, a plurality of levers each fulcrumed intermediate its ends on said shaft and having the portion between one end and its fulcrum providing a long arm and extending over said body of water and having the portion between the other end and its fulcrum providing a short arm, the long arms of said levers being of varying lengths, a float carried on the free end of each of said long arms and supported on the surface of the water for upward and downward movement in response to the movement of the waves of said water body, an upstanding cylinder having closed upper and lower ends spaced from each of the points of fulcrum of said levers, a piston mounted within said cylinder for reciprocal movement, a piston rod having one end projecting through the upper end of said cylinder and having the lower end operatively connected to said piston for effecting the movement of said piston, the free end of each of the short arms of said levers being connected to the projecting end of said piston rod, a check valved inlet and a check valved outlet at each of the upper and lower ends of said cylinder, a fluid reservoir connected in communication with each of said inlets, a conduit connecting said outlets to the inlet side of a fluid motor, a normally closed relief valve on said last-mentioned conduit operable to open said last-mentioned conduit to the flow of fluid in excess of that needed to drive said fluid motor, and a second conduit connecting the outlet side of said fluid motor to said reservoir.

2. An apparatus for producing power from water waves comprising a plurality of supports adapted to be positioned adjacent a body of water having waves therein, a horizontally disposed shaft extending through and carried by said supports, a plurality of levers each fulcrumed intermediate its ends on said shaft and having the portion between one end and its fulcrum providing a long arm and extending over said body of water and having the portion between the other end and its fulcrum providing a short arm, the long arms of said levers being of varying lengths, a float carried on the free end of each of said long arms and supported on the surface of the water for upward and downward movement in response to movement of the waves of said body of water, an upstanding cylinder having closed upper and lower ends spaced from each of said supports, a piston mounted within said cylinder for reciprocal movement, a piston rod having one end projecting through the upper end of said cylinder and having the lower end operatively connected to said piston for effecting the movement of said piston, a check valved inlet and a check valved outlet at each of the upper and lower ends of said cylinder, a fluid reservoir connected in communication with each of said inlets, a conduit connecting said outlets to the inlet side of a fluid motor, a normally closed relief valve in said last-mentioned conduit operable to open said last-mentioned conduit to the flow of fluid in excess of that needed to drive said fluid motor, and a second conduit connecting the outlet side of said fluid motor to said reservoir.

References Cited in the file of this patent

UNITED STATES PATENTS

| 582,282 | Greiner | May 11, 1897 |
| 589,520 | Wright | Sept. 7, 1897 |
| 599,756 | Wright | Mar. 1, 1898 |
| 625,101 | Essington | May 16, 1899 |
| 680,357 | Rhoads | Aug. 13, 1901 |
| 714,166 | Essington | Nov. 25, 1902 |
| 1,667,152 | Hegge | Apr. 24, 1928 |

FOREIGN PATENTS

| 359,414 | Italy | Mar. 21, 1938 |